United States Patent [19]

Sugano et al.

[11] Patent Number: 5,942,459

[45] Date of Patent: *Aug. 24, 1999

[54] CATALYSTS FOR OLEFIN POLYMERIZATION AND A PROCESS FOR PREPARING OLEFIN POLYMERS THEREWITH

[75] Inventors: Toshihiko Sugano; Kazuhiro Yamamoto, both of Yokohama, Japan

[73] Assignee: Mitsubishi Chemical Corporation, Tokyo-To, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/605,553

[22] Filed: Feb. 20, 1996

[30] Foreign Application Priority Data

Feb. 21, 1995 [JP] Japan .................................. 7-032620

[51] Int. Cl.$^6$ ...................................... C08F 4/64
[52] U.S. Cl. .......................... 502/117; 502/120; 502/152; 526/129; 526/131; 526/132; 526/160; 526/943
[58] Field of Search ................... 502/117, 120; 526/129, 131, 132

[56] References Cited

U.S. PATENT DOCUMENTS

| | | | |
|---|---|---|---|
| 4,912,075 | 3/1990 | Chang | 502/107 |
| 5,106,812 | 4/1992 | Yamaguchi | 502/439 |
| 5,354,721 | 10/1994 | Geerts | 502/117 |
| 5,444,134 | 8/1995 | Matsumoto | 526/159 |
| 5,468,702 | 11/1995 | Jejelowo | 502/104 |
| 5,474,962 | 12/1995 | Takahashi et al. | |

FOREIGN PATENT DOCUMENTS 0 515 132 11/1992 European Pat. Off. .
0 589 638 3/1994 European Pat. Off. .

OTHER PUBLICATIONS

Lehrbuch der Anorganischen Chemie, 81.–90., pp. 626–629, 1976, A. F. Holleman, et al.

*Primary Examiner*—David W. Wu
*Attorney, Agent, or Firm*—Oblon, Spivak, McClelland, Maier & Neustadt, P.C.

[57] ABSTRACT

The object of the present invention is to provide a polyolefin having a good particle property in a high yield without use of an expensive alumoxane. The present invention comprises a catalyst for olefin polymerization comprising the following ingredients (A), (B) and (C), and a process for preparing an olefin polymer with use of the catalyst:

Component (A): a transition metal compound having at least one conjugated five-membered ring ligand, the transition metal being in the Groups IV–VI of the Periodic Table, Component (B): an organoaluminum compound, and Component (C): a finely divided particle composition comprising 0.1–99.9% by weight of boric acid.

11 Claims, No Drawings

CATALYSTS FOR OLEFIN POLYMERIZATION AND A PROCESS FOR PREPARING OLEFIN POLYMERS THEREWITH

BACKGROUND OF THE INVENTION

1. Field of the Invention

The present invention relates to a catalyst for olefin polymerization and a process for preparing olefin polymers therewith. More particularly, it relates to a catalyst for olefin polymerization which exhibits a high catalytic activity even in the absence of an expensive methylalumoxane and is capable of producing polymers having a good particle property on its application to the polymerization of olefins, and to a process for preparing olefin polymers therewith.

2. Background Art

There have recently been proposed highly active catalysts for olefin polymerization comprising a combination of a zirconocene compound and a methylalumoxane (Japanese Patent Laid-Open Publication Nos. 19309/1983 and 35007/1985). Also known are proposals which make possible to prepare a variety of stereospecific polymers by using zirconocene compounds of the structure of ligands specifically designed (Japanese Patent Laid-Open Publication Nos. 130314/1986, 295607/1988, 301704/1989 and 41303/1990). To the best of the knowledge of the present inventors, while it would be possible to prepare highly active polymers having a narrow molecular weight distribution by means of these proposals, polymers obtainable would only be those having a very small particle diameter (usually about 1–50 $\mu$m) possibly because the catalysts may be soluble in the solvents used such as toluene and thus it would be difficult to produce polymers industrially in a high efficiency. These methods seem to require a large amount of an alumoxane and would thus be expensive, so that a variety of proposals have been done in order to solve the problems. It has been described in Japanese Patent Laid-Open Publication Nos. 51408/1989, 27560/1989 and 140305/1991 that an alumoxane and a metallocene compound are previously contacted to produce polymer products in a granulated form. However, to the best of our knowledge, the granulation of the polymer with this method would be possible only in the so-called liquid-phase bulk polymerization with propylene as a solvent, and no polymer having a controlled particle diameter would be obtained by slurry polymerization with an inert solvent or vapor phase polymerization.

Catalysts in which a catalyst ingredient is supported on an inorganic compound, particularly silica, have been proposed in Japanese Patent Laid-Open Publication Nos. 296008/1986, 51407/1988 and 152608/1988 and in WO 88/05058.

It has also been proposed to support a catalyst ingredient on polyethylene particles in Japanese Patent Laid-Open Publication No. 92621/1988 and WO 88/05058. Though these techniques would have made it possible to produce a granular polymer even in the case of vapor phase polymerization, problems would still remain such as poor polymer properties due to the content of a support material in the product which may amount to a considerable level because of insufficient catalyst activity per support which requires considerable amount of the catalyst plus support or the consumption of an expensive alumoxane in a large amount.

On the other hand, Japanese Patent Laid-Open Publication Nos. 501950/1989 and 502036/1989 and Japanese Patent Laid-Open Publication Nos. 179005/1991, 207703/1991 and 207704/1991 disclose catalysts comprising a Lewis acid such as an organoboron compound, for example tris(pentafluorophenyl)boron, an anionic compound such as carborane and tetrakis(pentafluorophenyl)borate, and a combination of an organoboron compound and a trialkylaluminum. However, polymerization with these catalysts would produce polymers only in the form of very small particles and commercial production of polymers in a high efficiency would not be feasible. Also, Japanese Patent Laid-Open Publication Nos. 179005/1991, 142306/1992, 148316/1993, 239138/1993 and 247128/1993 disclose catalyst systems comprising a supported organoboron co-catalyst, but the catalysts comprising these supported organoboron compounds, which include no boric acid, would, to the best of the knowledge of the present inventors, suffer from the catalyst activity appreciably lowered as compared with catalysts comprising no such supported organoboron compounds whereby they exhibit little cost cut effect in spite of employing no methylalumoxanes, and, in addition, the catalyst activity per support would be at an insufficient level. It has thus been desired to improve the catalyst systems.

As the other techniques for preparing catalysts for olefin polymerization, the combinations of a water-containing inorganic compound and an organoaluminum compound are described in Japanese Patent Laid-Open Publication Nos. 207303/1989, 224808/1992, and Japanese Patent Laid-Open Publication No. 501424/1993, but none of these techniques seem to us to give satisfactory catalyst activity. The employment of a Broensted acid or a clay mineral is described in Japanese Patent Laid-Open Publication No. 157651/1994 and in Japanese Patent Laid-Open Publication Nos. 105721/1993 and 301917/1993, respectively, but the latter proposal would entail a problem that the clay mineral is exceptional as a support and it would thus difficult to control its characteristics.

The present invention has been done in order to solve the problems in the prior art, and the objects of the present invention is to provide a catalyst which makes possible to prepare a polymer having a good particle property in a high yield even in the absence of an expensive alumoxane even if it is applied to slurry polymerization or vapor phase polymerization without any special support material and to prepare an olefin polymer with the catalyst.

SUMMARY OF THE INVENTION

The present invention presents a catalyst for olefin polymerization which comprises:

Component (A) which is a transition metal compound having at least one conjugated five-membered ring ligand, the transition metal being in the Groups IV–VI of the Periodic Table;

Component (B) which is an organoaluminum compound; and Component (C) which is a finely divided particle composition comprising 0.1–99.9% by weight of boric acid.

The present invention makes it possible to provide a polyolefin having a good particle property in a high yield in the absence of an alumoxane which is expensive. Such an effect is assumed to be unexpected from the conventional techniques.

DETAILED DESCRIPTION OF THE PREFERRED EMBODIMENT OF THE INVENTION

[Catalyst]

The catalyst for olefin polymerization according to the present invention comprises the Components (A), (B) and (C). The catalyst for olefin polymerization according to the present invention can be obtained by contacting Components (A), (B) and (C) as well as other optional components in any sequence desired.

It is also possible to bring the respective Components into contact with each other in any state desired and then to subject the contact product to preliminary polymerization in which the contact product is contacted with an olefin and the olefin is polymerized in a small amount, which catalyst having undergone the preliminary will then be used in the "main" polymerization.

<Component (A)>

The Component (A) of the catalyst for olefin polymerization according to the present invention is a transition metal compound having at least one conjugated five-membered ring ligand, the transition metal being in the groups IV–VI of the Periodic Table.

Specific examples of the preferred compound as the Component (A) include the transition metal compounds represented by the formulae [I], [II], [III] or [IV]:

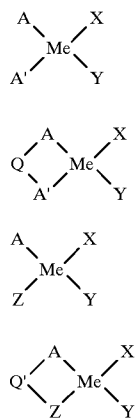

wherein Me represents a metal atom selected from the Groups IV–VI of the Periodic Table, A and A', which may be the same or different within the same compound, represent a conjugated five-membered ring ligand, Q represents a bonding moiety which crosslinks two conjugated five-membered ring ligands at any positions, Z represents a ligand containing nitrogen, oxygen, silicon, phosphorus or sulfur atom which is bonded to Me, Q' represents a bonding moiety which crosslinks the conjugated five-membered ligand at its any position with the moiety Z, and X and Y represent a hydrogen atom, a halogen atom, a hydrocarbyl group, an alkoxy group, an amino group, a phosphorus-containing hydrocarbon group or a silicon-containing hydrocarbon group, respectively.

A and A' are, as described above, conjugated five-membered ring ligands and may be the same or different within the same compound. Typical examples of the conjugated five-membered ring ligands (A and A') include a conjugated carbon five-membered ligand, i.e. a cyclopentadienyl group. The cyclopentadienyl group may be either of the one containing five hydrogen atoms ($C_5H_5-$) or its derivatives in which some of the hydrogen atoms have been replaced by substituents. A typical example of the substituent is a hydrocarbyl group having 1–20 carbon atoms, preferably 1–12 carbon atoms. The hydrocarbyl group may be in either of a form such that it is a monovalent group and bonded to the cyclopentadienyl group, or a form such that, when two or more hydrocarbyl groups are present, two of the moieties are bonded to each other at the other ends, viz. ω-terminus, to form a ring together with a part of the cyclopentadienyl moiety. Typical examples of the latter include the ones in which the two substituents are bonded to each other at the ω-termini to form a fused six-membered ring together with the two vicinal carbon atoms in the cyclopentadienyl group, i.e. an indenyl group or a fluorenyl group, wherein the total of the carbon atoms of the two substituents on the cyclopentadienyl group amounts to more than 4, which form a fused six-membered ring sharing the two vicinal carbon atoms in the cyclopentadienyl group, the surplus makes a substituent on the indenyl or fluorenyl group.

Thus, the typical examples of the conjugated five-membered ring ligands, A and A', may be substituted or unsubstituted cyclopentadienyl, indenyl or fluorenyl groups.

The substituents on the cyclopentadienyl group include in addition to the above described hydrocarbyl group having 1–20, preferably 1–12 carbon atoms, a halogen atom such as fluorine, chlorine or bromine; an alkoxy group such as a $C_1$–$C_{12}$ alkoxy group, a silicon-containing hydrocarbon group such as a hydrocarbon group having 1–24 carbon atoms which contains a silicon atom in the form of —Si$(R^1)(R^2)(R^3)$; a phosphorus-containing hydrocarbon group such as a hydrocarbon group having 1–18 carbon atoms which contains a phosphorus atom in the form of —P$(R^1)(R^2)$; a nitrogen-containing hydrocarbon group such as a hydrocarbon group having 1–18 carbon atoms which contains a nitrogen atom in the form of —N$(R^1)(R^2)$; or a boron-containing hydrocarbon group such as a hydrocarbon group having 1–18 carbon atoms which contains a boron atom in the form of —B$(R^1)(R^2)$. When a plurality of these substituents are present in a single compound, these substituents may be the same or different.

Q represents a bonding moiety which crosslinks two of the conjugated five-membered ring ligands at any positions desired, and Q' represents a bonding moiety which crosslinks the conjugated five-membered ring ligand at its any position with the moiety Z.

In particular, Q and Q' represent:

(a) an alkylene group having 1–20 carbon atoms such as a methylene group, an ethylene group, an isopropylene group, a phenylmethylmethylene group, a diphenylmethylene group, and a cyclohexylene group;

(b) a silylene group such as a silylene group, a dimethylsilylene group, a phenylmethylsilylene group, a diphenylsilylene group, a disilylene group, and a tetramethyldisilylene group;

(c) a hydrocarbon group containing germanium, phosphorus, nitrogen, boron or aluminum, specifically the groups such as $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$, $(CH_3O)Al$, and the like. The preferred ones are the alkylene group and the silylene group.

Me is a metal atom selected from those of the groups IV–VI in the Periodic Table, preferably titanium, zirconium and hafnium, particularly titanium and zirconium.

Z is a ligand containing a nitrogen, an oxygen, a silicon, a phosphorus or a sulfur atom which is bonded to Me. Preferred examples of Z specifically include ligands such as an oxygen (—O—), a sulfur (—S—), an alkoxy group having 1–20 carbon atoms, preferably 1–10 carbon atoms, a thioalkoxy group having 1–20 carbon atoms, preferably 1–12 carbon atoms, a silicon-containing hydrocarbon group containing 1–40 carbon atoms, preferably 1–18 carbon atoms, a nitrogen-containing hydrocarbon group containing 1–40 carbon atoms, preferably 1–18 carbon atoms, and a phosphorus-containing hydrocarbon group containing 1–40 carbon atoms, preferably 1–18 carbon atoms.

Each of X and Y is a hydrogen group, a halogen atom, a hydrocarbyl group containing 1–20 carbon atoms, preferably 1–10 carbon atoms, an alkoxy group containing 1–20 carbon atoms, preferably 1–10 carbon atoms, an amino group, a phosphorus-containing hydrocarbon group having 1–20 carbon atoms, preferably 1–12 carbon atoms such as specifically a diphenylphosphine group or a silicon-containing hydrocarbon group having 1–20 carbon atoms, preferably 1–12 carbon atoms such as specifically a trimethylsilyl group or a bis(trimethylsilyl)methyl group. X and Y may be the same or different within the single compound. Among these groups, a halogen atom, a hydrocarbyl group, particularly those having 1–8 carbon atoms, and an amino group are preferred.

Accordingly, the preferred specifies of Component (A) for the catalyst for olefin polymerization according to the present invention are those represented by the general formulae [I], [II], [III] or [IV] wherein the substituents are as follows.

A, A': cyclopentadienyl, n-butyl-cyclopentadienyl, indenyl, 2-methyl-indenyl, 2-methyl-4-phenylindenyl, tetrahydroindenyl, 2-methyl-tetrahydroindenyl, 2-methylbenzindenyl, 1-phenyl-3-methylindenyl, 2-methyl-4-phenylazulenyl, 2,3,4,5-tetramethylphosphoryl, and 1-indolyl-2-methylindenyl;
Q, Q': ethylene, dimethylsilylene, and isopropylidene;
Z: t-butylamido, phenylamido, and cyclohexylamido;
Me: a transition metal in the Group IV; and
X, Y: chlorine, methyl, and diethylamino.

Among those compounds, more preferred one includes the compounds represented by the formulae (I), (II) or (IV).

In the present invention, the Component (A) can be used as a mixture of at least two selected from one of the formulae [I] to [IV] and/or from two or more of compounds represented by the same.

Specific examples of the transition metal compound when Me is zirconium include:

(a) compounds represented by the formula [I], viz. the transition metal compounds having no bonding moiety Q and two conjugated five-membered ring ligands, such as:
  (1) bis(cyclopentadienyl)zirconium dichloride,
  (2) bis(methylcyclopentadienyl)zirconium dichloride,
  (3) bis(dimethylcyclopentadienyl)zirconium dichloride,
  (4) bis(trimethylcyclopentadienyl)zirconium dichloride,
  (5) bis(tetramethylcyclopentadienyl)zirconium dichloride,
  (6) bis(pentamethylcyclopentadienyl)zirconium dichloride,
  (7) bis(n-butylcyclopentadienyl)zirconium dichloride,
  (8) bis(indenyl)zirconium dichloride,
  (9) bis(fluorenyl)zirconium dichloride,
  (10) bis(cyclopentadienyl)zirconium monochloride monohydride,
  (11) bis(cyclopentadienyl)methylzirconium monochloride,
  (12) bis(cyclopentadienyl)ethylzirconium monochloride,
  (13) bis(cyclopentadienyl)phenylzirconium monochloride,
  (14) bis(cyclopentadienyl)zirconium dimethyl,
  (15) bis(cyclopentadienyl)zirconium diphenyl,
  (16) bis(cyclopentadienyl)zirconium dineopentyl,
  (17) bis(cyclopentadienyl)zirconium dihydride,
  (18) (cyclopentadienyl)(indenyl)zirconium dichloride,
  (19) (cyclopentadienyl)(fluorenyl)zirconium dichloride, and
  (20) bis(2,3,4,5-tetramethylphosphoryl)zirconium dichloride;

(b) compounds represented by the formula [II], viz. the one in which the bonding moiety Q is, for example, such that:
  (b-1) Q is an alkylene group, such as
  (1) methylenebis(indenyl)zirconium dichloride,
  (2) ethylenebis(indenyl)zirconium dichloride,
  (3) ethylenebis(indenyl)zirconium monohydride monochloride,
  (4) ethylenebis(indenyl)methylzirconium monochloride,
  (5) ethylenebis(indenyl)zirconium monomethoxide monochloride,
  (6) ethylenebis(indenyl)zirconium diethoxide,
  (7) ethylenebis(indenyl)zirconium dimethyl,
  (8) ethylenebis(4,5,6,7-tetrahydroindenyl)zirconium dichloride,
  (9) ethylenebis(2-methylindenyl)zirconium dichloride,
  (10) ethylenebis(2-ethylindenyl)zirconium dichloride,
  (11) ethylenebis(2,4-dimethylindenyl)zirconium dichloride,
  (12) ethylene(2,4-dimethylcyclopentadienyl)(3',5'-dimethylcyclopentadienyl)zirconium dichloride,
  (13) ethylene(2-methyl-4-tert-butylcyclopentadienyl)(3'-tert-butyl-5'-methylcyclopentadienyl)zirconium dichloride,
  (14) ethylene(2,3,5-trimethylcyclopentadienyl)(2',4',5'-trimethylcyclopentadienyl)zirconium dichloride,
  (15) ethylene-1,2-bis(4-indenyl)zirconium dichloride,
  (16) ethylene-1,2-bis[4-(2,7-dimethylindenyl)]zirconium dichloride,
  (17) ethylene-1,2-bis(4-phenylindenyl)zirconium dichloride,
  (18) isopropylidenebis(indenyl)zirconium dichloride,
  (19) isopropylidene(2,4-dimethylcyclopentadienyl)(3',5'-dimethylcyclopentadienyl)zirconium dichloride,
  (20) isopropylidene(2-methyl-4-tert-butylcyclopentadienyl)(3'-tert-butyl-5'-methylcyclopentadienyl)zirconium dichloride,
  (21) methylene(cyclopentadienyl)(3,4-dimethylcyclopentadienyl)zirconium dichloride,
  (22) methylene(cyclopentadienyl)(3,4-dimethylcyclopentadienyl)zirconium dichloride hydride,
  (23) methylene(cyclopentadienyl)(3,4-dimethylcyclopentadienyl)zirconium dimethyl,
  (24) methylene(cyclopentadienyl)(3,4-dimethylcyclopentadienyl)zirconium diphenyl,
  (25) methylene(cyclopentadienyl)(trimethylcyclopentadienyl)zirconium dichloride,
  (26) methylene(cyclopentadienyl)(tetramethylcyclopentadienyl)zirconium dichloride,
  (27) isopropylidene(cyclopentadienyl)(3,4-dimethylcyclopentadienyl)zirconium dichloride,
  (28) isopropylidene(cyclopentadienyl)(2,3,4,5-tetramethylcyclopentadienyl)zirconium dichloride,
  (29) isopropylidene(cyclopentadienyl)(3-methylindenyl)zirconium dichloride,
  (30) isopropylidene(cyclopentadienyl)(fluorenyl)zirconium dichloride,
  (31) isopropylidene(2-methylcyclopentadienyl)(fluorenyl)zirconium dichloride,
  (32) isopropylidene(3-tert-butylcyclopentadienyl)(fluorenyl)zirconium dichloride,

(33) isopropylidene(2,5-dimethylcyclopentadienyl)(3',4'-dimethylcyclopentadienyl)zirconium dichloride,
(34) isopropylidene(2,5-dimethylcyclopentadienyl)(fluorenyl)zirconium dichloride,
(35) ethylene(cyclopentadienyl)(3,5-dimethylcyclopentadienyl)zirconium dichloride,
(36) ethylene(cyclopentadienyl)(fluorenyl)zirconium dichlorde,
(37) ethylene(2,5-dimethylcyclopentadienyl)(fluorenyl)zirconium dichloride,
(38) ethylene(2,5-diethylcyclopentadienyl)(fluorenyl)zirconium dichloride,
(39) diphenylmethylene(cyclopentadienyl)(3,4-diethylcyclopentadienyl)zirconium dichloride,
(40) diphenylmethylene(cyclopentadienyl)(3,4-diethylcyclopentadienyl)zirconium dichloride,
(41) cyclohexylidene(cyclopentadienyl)(fluorenyl)zirconium dichlorde, and
(42) cyclohexylidene(2,5-dimethylcyclopentadienyl)(3',4'-dimethylcyclopentadienyl)zirconium dichloride;

(b-2) Q is a silylene group, such as
(1) dimethylsilylenebis(indenyl)zirconium dichloride,
(2) dimethylsilylenebis(4,5,6,7-tetrahydroindenyl)zirconium dichloride,
(3) dimethylsilylenebis(2-methylindenyl)zirconium dichloride,
(4) dimethylsilylenebis(2,4-dimethylindenyl)zirconium dichloride,
(5) dimethylsilylenebis(2-methyl-4,5,6,7-tetrahydroindenyl)zirconium dichloride,
(6) dimethylsilylene(2,5-dimethylcyclopentadienyl)(3',5'-dimethylcyclopentadienyl)zirconium dichloride,
(7) dimethylsilylenebis(2-methyl-4,5-benzindenyl)zirconium dichloride,
(8) dimethylsilylenebis(2-methyl-4-phenylindenyl)zirconium dichloride,
(9) dimethylsilylenebis(2-methyl-4,4-dimethyl-4,5,6,7-tetrahydro-4-silaindenyl)zirconium dichloride,
(10) dimethylsilylenebis[4-(2-phenylindenyl)]zirconium dichloride,
(11) dimethylsilylenebis[4-(2-tert-butylindenyl)]zirconium dichloride,
(12) dimethylsilylenebis[4-(1-phenyl-3-methylindenyl)]zirconium dichloride,
(13) phenylmethylsilylenebis(indenyl)zirconium dichloride,
(14) phenylmethylsilylenebis(4,5,6,7-tetrahydroindenyl)zirconium dichloride,
(15) phenylmethylsilylene(2,4-dimethylcyclopentadienyl)(3',5'-dimethylcyclopentadienyl)-zirconium dichloride,
(16) phenylmethylsilylene(2,3,5-trimethylcyclopentadienyl)-(2',4',5'-trimethylcyclopentadienyl)zirconium dichloride,
(17) phenylmethylsilylenebis(tetramethylcyclopentadienyl)zirconium dichloride,
(18) diphenylsilylenebis(indenyl)zirconium dichloride,
(19) tetramethyldisilylenebis(indenyl)zirconium dichloride,
(20) tetramethyldisilylenebis(cyclopentadienyl)zirconium dichloride,
(21) tetramethyldisilylene(3-methylcyclopentadienyl)(indenyl)zirconium dichloride,
(22) dimethylsilylene(cyclopentadienyl)(3,4-dimethylcyclopentadienyl)zirconium dichloride,
(23) dimethylsilylene(cyclopentadienyl)(trimethylcyclopentadienyl)zirconium dichloride,
(24) dimethylsilylene(cyclopentadienyl)(tetramethylcyclopentadienyl)zirconium dichloride,
(25) dimethylsilylene(cyclopentadienyl)(3,4-diethylcyclopentadienyl)zirconium dichloride,
(26) dimethylsilylene(cyclopentadienyl)(triethylcyclopentadienyl)zirconium dichloride,
(27) dimethylsilylene(cyclopentadienyl)(tetraethylcyclopentadienyl)zirconium dichloride,
(28) dimethylsilylene(cyclopentadienyl)(fluorenyl)zirconium dichloride,
(29) dimethylsilylene(3-tert-butyl-cyclopentadienyl)(fluorenyl)zirconium dichloride,
(30) dimethylsilylene(cyclopentadienyl)(2,7-di-tert-butylfluorenyl)zirconium dichloride,
(31) dimethylsilylene(cyclopentadienyl)(octahydrofluorenyl)zirconium dichloride,
(32) dimethylsilylene(2-methylcyclopentadienyl)(fluorenyl)zirconium dichloride,
(33) dimethylsilylene(2,5-dimethylcyclopentadienyl)(fluorenyl)zirconium dichloride,
(34) dimethylsilylene(2-ethylcyclopentadienyl)(fluorenyl)zirconium dichloride,
(35) dimethylsilylene(2,5-diethylcyclopentadienyl)(fluorenyl)zirconium dichloride,
(36) diethylsilylene(2-methylcyclopentadienyl)(2,7-di-tert-butylfluorenyl)zirconium dichloride,
(37) dimethylsilylene(2,5-dimethylcyclopentadienyl)(2,7-di-tert-butylfluorenyl)zirconium dichloride,
(38) dimethylsilylene(2-ethylcyclopentadienyl)(2,7'-di-tert-butylfluorenyl)zirconium dichloride,
(39) dimethylsilylene(diethylcyclopentadienyl)(2,7-di-tert-butylfluorenyl)zirconium dichloride,
(40) dimethylsilylene(methylcyclopentadienyl)(octahydrofluorenyl)zirconium dichloride,
(41) dimethylsilylene(dimethylcyclopentadienyl)(octahydrofluorenyl)zirconium dichloride,
(42) dimethylsilylene(ethylcyclopentadienyl)(octahydrofluorenyl)zirconium dichloride,
(43) dimethylsilylene(diethylcyclopentadienyl)(octahydrofluorenyl)zirconium dichloride,
(44) dimethylsilylenebis(2-methyl-4-phenylazulenyl)zirconium dichloride, and
(45) dimethylsilylenebis[4-(1-indolyl)-2-methylindenyl]zirconium dichloride;

(b-3) Q is a hydrocarbon group containing germanium, phosphorus, nitrogen, boron or aluminum, such as
(1) dimethylgermaniumbis(indenyl)zirconium dichloride,
(2) dimethylgermanium(cyclopentadienyl)(fluorenyl)zirconium dichloride,
(3) methylaluminumbis(indenyl)zirconium dichloride,
(4) phenylaluminumbis(indenyl)zirconium dichloride,
(5) phenylphosphinobis(indenyl)zirconium dichloride,
(6) ethylboranobis(indenyl)zirconium dichloride,
(7) phenylaminobis(indenyl)zirconium dichloride, and
(8) phenylamino(cyclopentadienyl)(fluorenyl)zirconium dichloride;

(c) the compound represented by the formula [III], viz. the transition metal compound having no bonding moiety Q' and one conjugated five-membered ring ligand such as
(1) pentamethylcyclopentadienyl-bis(phenyl)aminozirconium dichloride,
(2) indenyl-bis(phenyl)amidozirconium dichloride,
(3) pentamethylcyclopentadienyl-bis(trimethylsilyl)aminozirconium dichloride, and
(4) pentamethylcyclopentadienylphenoxy-zirconium dichloride;

(d) the compound represented by the formula [IV], viz. the transition metal compound having one conjugated five-membered ring ligand which is crosslinked with the bonding moiety Q' such as:
  (1) dimethylsilylene(tetramethylcyclopentadienyl)phenylamidozirconium dichloride,
  (2) dimethylsilylene(tetramethylcyclopentadienyl)tert-butylamidozirconium dichloride,
  (3) dimethylsilylene(indenyl)cyclohexylamidozirconium dichloride,
  (4) dimethylsilylene(tetrahydroindenyl)decylamidozirconium dichloride,
  (5) dimethylsilylene(tetrahydroindenyl)[(trimethylsilyl)amino]zirconium dichloride, and
  (6) dimethylgerman(tetramethylcyclopentadienyl)(phenyl)aminozirconium dichloride;
(e) the compounds of the groups (a)–(d) above in which chlorine has been replaced by a group such as bromine, iodine, hydride, methyl or phenyl, which can also be used.

Furthermore, it is possible to use the zirconium compounds illustrated in (a)–(e) as the Component (A) in which zirconium as the central metal has been replaced by titanium, hafnium, niobium, molybdenum or wolfram.

Preferred among these compounds are the zirconium compounds, the hafnium compounds and the titanium compounds. More preferred are the titanium compounds, the zirconium compounds and the hafnium compounds which have been crosslinked with an alkylene group or a silylene group.

<Component (B)>

The Component (B) is an organoaluminum compound. Specific examples of the preferred organoaluminum compounds include those represented by the formula $R_3Al$, wherein R represents hydrogen atom, halogen atom, a siloxy group, a siloxy group crosslinked with an alkylene having 1–6 carbon atoms, or a hydrocarbyl group having 1–10 carbon atoms, preferably 1–4 carbon atoms and may be the same or different when a plurality of Rs are present, provided that at least one of the three Rs represents a hydrocarbyl group having 1–10 carbon atoms, preferably 1–4 carbon atoms.

Specific examples of the preferred compounds include (a) trialkylaluminums such as trimethylaluminum, triethylaluminum, triisobutylaluminum, trihexylaluminum, trioctylaluminum, tridecylaluminum, tri-n-butylaluminum, tri-n-propylaluminum, and triisoprenylaluminum; (b) alkylaluminum halides such as dimethylaluminum chloride, diethylaluminum monochloride, diisobutylaluminum monochloride, methylaluminum sesquichloride, and ethylaluminum dichloride; (c) alkylaluminum hydrides such as dimethylaluminum hydride, and diethylaluminum hydride, and diisobutylaluminum hydride; and (d) alkylaluminumsiloxides such as dimethylaluminum(trimethylsiloxide), and diethylaluminum(trimethylsiloxide). It is also possible to use the combination of the two or more of these compounds in the same or different groups.

The Preferred of these organoaluminum compounds include methylaluminum, ethylaluminum and isobutylaluminum derivatives in which at least one of Rs in the above described formula is methyl, ethyl or isobutyl such as, for example, trimethylaluminum, triethylaluminum, triisobutylaluminum, dimethylaluminum chloride, diisobutylaluminum monochloride, and diisobutylaluminum hydride. More preferred ones are trimethylaluminum, triethylaluminum, triisobutylaluminum, and a mixture thereof.

<Component (C)>

The Component (C) is a finely divided particle composition comprising 0.1–99.9% by weight, preferably 1–50% by weight, particularly 3–35% by weight, of boric acid. The composition can thus contain another ingredient to the balance of the composition, which is also finely divided material.

The ingredient other than boric acid (referred sometimes to hereinafter as the ingredient (i)), which will hereinbelow be referred to as ingredient (ii), comprise 99.9–0.1% by weight, preferably 99–50% by weight, more preferably 97–65% by weight on the basis of the finely divided particle composition.

The finely divided particle composition of the Component (C) should be the one of which the constituent particles have sufficiently small particle diameters. Preferred particle diameters are in the range of 3,000 μm or less, generally in the range of 1–3,000 μm, preferably 5–2,000 μm, more preferably 10–1,000 μm. In other words, it can be said that the finely divided particle composition having the preferred particle diameter is the one which substantially passes through a sieve of the mesh size of 3,000 μm, and that the composition having the particularly preferred particle diameter substantially passes through a sieve of the mesh size of 3,000 μm but does not pass through a sieve of the mesh size of 10 μm.

The Component (C) is, as repeatedly described above, a finely divided particle composition comprising boric acid. The term "comprising" herein means to include products obtained by any of the methods for combining the both ingredients (ingredients (i) and (ii)) in order to prepare the finely divided composition (described in detail below) and specifically includes the state that boric acid (the ingredient (i)) and the finely divided particulate materials (the ingredient (ii)) are simply mixed with each other, the state that one of the ingredients, particularly ingredient (i), i.e. boric acid, in the form of a solution is mixed with the ingredient (ii) and then the solvent used is removed by distillation, and the like. In any cases, boric acid itself should have the above mentioned finely divided particle property particularly when boric acid is mixed with the finely divided particulate materials of the ingredient (ii).

(1) Ingredient (i)

The ingredient (i) is boric acid. The term "boric acid" as the ingredient (i) typically means "an oxyacid produced by the hydration of diboron trioxide". Thus, it includes, in addition of orthoboric acid which is often called simply boric acid, metaboric acid and tetraboric acid. The compounds can be used alone or as a mixture thereof.

Boric acid preferably used in the present invention is represented by the following formula

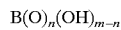

$$B(O)_n(OH)_{m-n} \qquad [VI]$$

wherein n and m are such that, under the conditions of 0<m−n≦3, 0<n <1.5, and n<m≦3, m is 3 when n is 0; m is 2<m<3 when n is 0<n<1; m is 2 when n is 1, and m is 1.5<m<2 when n is 1<n<1.5.

Among these compounds, orthoboric acid (n=0, m=3) and metaboric acid (n=1, m=2) are particularly preferred.

(2) Ingredient (ii)

The ingredient (ii) is a finely divided material other than boric acid as the ingredient (i). The finely divided materials may be either organic or inorganic materials.

The organic materials include (a) α-olefin polymers, preferably those selected from the group consisting of polyethylene, polypropylene, polybutene-1, an ethylene-propylene copolymer, an ethylene-butene-1 copolymer, an ethylene-hexene-1 copolymer, a propylene-butene-1 copolymer, a propylene-hexene-1 copolymer, and a propylene-divinylbenzene copolymer; (b) aromatic unsaturated hydrocarbon polymers, preferably those selected from polystyrene, a styrene-divinylbenzene copolymer, a styrene-butadiene copolymer, and a styrene-isoprene copolymer; (c) polymers containing a polar moiety, preferably those selected from the group consisting of a poly(meth)acrylate ester, polyacrylonitrile, polyvinyl chloride, polyamide, polyphenylene ether, polyethylene terephthalate, and polycarbonate; and those which are known as an ion-exchange resin.

The inorganic materials include (d) inorganic oxides, preferably those selected from the group consisting of $SiO_2$, $Al_2O_3$, $AlPO_4$, MgO, $ZrO_2$, $TiO_2$, $B_2O_3$, CaO, ZnO, BaO, ThO, $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO; (e) inorganic halides, preferably those selected from the group consisting of $MgCl_2$, $AlCl_3$ and $MnCl_2$; (f) inorganic carbonates, sulfates or nitrates, preferably those selected from the group consisting of $Na_2CO_3$, $K_2CO_3$, $CaCO_3$, $MgCO_3$, $Al_2(SO_4)_3$, $BaSO_4$, $KNO_3$, and $Mg(NO_3)_2$; and (g) inorganic hydroxides, preferably those selected from the group consisting of $Mg(OH)_2$, $Al(OH)_3$, and $Ca(OH)_2$. These inorganic materials can be a mixture of the materials selected from any of the single class of (a)–(g) or from a plurality of the classes (a)–(g).

(3) Preparation of the Component (C)

The Component (C) can be obtained by contacting the ingredients (i) and (ii) at once or in steps.

The method of contacting the ingredients includes the methods where (a) the ingredients (i) and (ii) are contacted in the form of solid and then ground, (b) the ingredients (i) and (ii) are contacted in a solvent in which either one of the ingredients is soluble or suspended, and the solvent is then removed, (c) the ingredients (i) and (ii) are contacted in a solvent in which both of the ingredients is soluble or suspended, and the solvent is then removed or the solids are coprecipitated to obtain the solid ingredients. Among these methods, the preferred is the method (b), and more preferred is the method (b) where the ingredients (i) and (ii) are contacted in a solvent in which the ingredient (i) is soluble. The solvent used in this case includes active hydrogen containing compounds such as water, methanol and ethanol; electron donor compounds such as an ether, an ester and an amine; and hydrocarbon solvents such as hexane, heptane, octane, benzene, toluene, xylene, cyclohexane, cyclooctane, and decaline.

The contact mixture obtained by any of the aforementioned operations can be used as the Component (C) of the catalyst for olefin polymerization according to the present invention directly or after an appropriate-post-treatment. Preferred post-treatment includes the heating of the contact mixture at a certain temperatures (generally in the range of 0–600° C., preferably 10–300° C., more preferably 10–200° C.) for a certain period.

<Optional Component>

As described above, the catalyst for olefin polymerization according to the present invention can comprises, in addition to the above described Component (A), (B) and (C), an appropriate component that is the catalyst in the present invention can comprise any ingredients as far as the advantages inherent in the present invention are not impaired.

Optional ingredients which can be added include (a) active hydrogen containing compounds such as, preferably, water, methanol and ethanol; (b) electron donor compounds such as, preferably, an ether, an ester and an amine; (c) alkoxy containing compounds such as, preferably, phenoxy borate, dimethylmethoxyaluminum, phosphorous phenoxide, tetraethoxysilane, and diphenyldimethoxysilane; and (d) organoboron compounds such as, preferably, triethylborane, triphenylborane, tris(pentafluorophenyl) borane, triphenylcarbyl-tetrakis(pentafluorophenyl)borane.

<Preparation of catalyst>

The catalyst for olefin polymerization according to the present invention can be obtained by contacting the Components (A), (B) and (C) and the optional ingredients. These materials may be contacted in any sequences and modes provided that they are within the purview of the present invention, and the materials can be contacted at the same time or stepwise in or outside the polymerization vessel in the presence or absence of a solvent.

Referring to the amounts of the materials used, the transition metal (M) in the Component (A) and Al in the Component (B) are used in an atomic ratio of 1:0.1 to 1:100,000, preferably 1:3 to 1:3,000. The compound of the Component (A) is used in an amount of $1\times10^{-5}$ to 1 g, preferably $1\times10^{-4}$ to $1.0\times10^{-1}$ g, more preferably $5\times10^{-4}$ to $5\times10^{-2}$ g per g of the Component (C). The ingredient (B) is used in an amount of $1\times10^{-4}$ to 10 g, preferably $1\times10^{-3}$ to 5 g, more preferably $5\times10^{-3}$ to 2 g per g of the Component (C).

It is also possible to use the catalyst for olefin polymerization according to the present invention as the one having been subjected to optional preliminary polymerization which comprises bringing the catalyst into contact with an olefin and polymerizing a small amount of the olefin. Preliminary polymerization is generally carried out by the slurry polymerization in an inert solvent or by the vapor phase polymerization under a vapor phase condition. Monomers to be used to the preliminary polymerization preferably include ethylene, propylene, butene-1, 3-methylbutene-1, 4-methylpentene-1, hexene-1, styrene, divinylbenzene, or a mixture thereof. It is also possible to carry out preliminary polymerization optionally in the presence of hydrogen in order to control the molecular weight of the polymer formed, and it is also possible to carry out preliminary polymerization in the presence of an inert gas such as nitrogen in order to control the reaction. Preliminary polymerization is carried out at a temperature in the range of −78° C. to 100° C., preferably −78° C. to 50° C. Preliminary polymerization is carried out for 1 minute to 24 hours, preferably 5 minutes to 10 hours. Preliminary polymerization may produce a polymer in the range of 0.01 to 500 g, preferably 0.05 to 100 g, more preferably 0.1 to 30 g per g of the solid Components used. Preliminary polymerization is generally conducted under the temperature and/or pressure conditions milder than those of the main polymerization.

[Use of catalyst/Polymerization of olefins]

The catalyst for olefin polymerization according to the present invention is naturally applied to the solvent polymerization with a solvent used, and it is also applied to the liquid phase solvent-free polymerization with substantially no solvent used, vapor phase polymerization, or molten polymerization where polymer formed is molten. It is also applied to the continuous polymerization or the batch-wise polymerization.

As the solvent in the solvent polymerization, saturated aliphatic or aromatic hydrocarbon solvents such as hexane, heptane, pentane, cyclohexane, benzene or toluene are used alone or as an admixture thereof.

Polymerization is carried out at a temperature of about −78 to 350° C., preferably −20 to 250° C., more preferably 0 to 100° C. The pressure of an olefin in the reaction system, which is not specifically limited, is preferably in the range from atmospheric pressure to 3,000 kg/cm$^2$-G, more preferably from atmospheric pressure to 1,000 kg/cm$^2$-G, particularly from atmospheric pressure to 50 kg/cm$^2$-G. It is also possible to adjust the molecular weight of a polymer produced in polymerization by well-known means such as the selection of temperature or pressure or the introduction of hydrogen.

Olefins polymerized by the catalyst according to the present invention include ethylene in the present invention, and the olefins used for the polymerization reaction in the process of the present invention are α-olefins having 2 to 20 carbon atoms, preferably 2 to 10 carbon atoms. The α-olefins specifically include ethylene, propylene, 1-butene, 4-methyl-1-pentene, 1-hexene, 1-octene, 1-decene, 1-dodecene, 1-tetradecene, 1-hexadecene, 1-octadecene, 1-eicosene, and the like, particularly ethylene, propylene, 1-butene, 1-hexene and 4-methyl-1-pentene. These olefins can be subjected to polymerization singly or in admixture of the two or more.

Furthermore, the catalyst according to the present invention is effective also in the copolymerization of the other monomers which are capable of copolymerizing with the aforementioned α-olefins and include conjugated and non-conjugated dienes such as butadiene, 1,4-hexadiene, 1,5-hexadiene, 1,7-octadiene, 1,8-nonadiene, 7-methyl-1,6-octadiene, and 1,9-decadiene, and cyclic olefins such as cyclopropene, cyclobutene, cyclopentene, norbornene, and dicyclopentadiene.

It goes without saying that the catalyst according to the present invention comprising the Components (A) to (C) can be used as such for polymerization, but it is also possible to use the catalyst in the presence of an organoaluminum compounds an additional ingredient during polymerization in order, for example, to prevent the reaction system from being poisoned, if necessary.

Specific examples of the organoaluminum compound preferably include (a) trialkylaluminum such as trimethylaluminum, triethylaluminum, triisobutylaluminum, trihexyl-aluminum, trioctylaluminum, and tridecylaluminum; (b) alkylaluminum halides such as diethylaluminum monochloride, diisobutylaluminum monochloride, ethylaluminum sesquichloride, and ethylaluminum dichloride; (c) alkylaluminum hydrides such as diethylaluminum hydride, and diisobutylaluminum hydride; (d) aluminum alkoxides such as diethylaluminum ethoxide, dimethylaluminum trimethylsiloxide, and diethylaluminum phenoxide; (e) alumoxanes such as methylalumoxane, ethylalumoxane, isobutylalumoxane, and methylisobutylalumoxane. It is also possible to use in admixture of the two or more of these organoaluminum compounds selected from a single class of (a) to (e) and/or from a plurality of classes (a) to (e). Among these organoaluminum compounds, a trialkylaluminum or an aluminum alkoxide is preferred. More preferred ones are organoaluminum having a methyl group, an ethyl group and an isobutyl group.

EXAMPLE 1

(1) Preparation of the Catalyst Component (C)

20 g of silica gel (Davison, #948 which passes through a sieve having a mesh size of 100 μm but remains on a sieve having a mesh size of 10 μm and 5 g of boric acid (Wako, sp. gr.) were placed in a flask, and 80 ml of water was added. The mixture was heated to 80° C. and maintained at the temperature for 10 minutes in an oil bath. The temperature of the oil bath was set at 100° C. and the flask was maintained under the stream of nitrogen in order to remove almost of water. The temperature of the oil bath was further raised up to 150° C. and maintained for 2 hours to obtain the Component (C).

(2) Polymerization

An 1 liter autoclave was purged with ethylene and charged with 500 ml of toluene, 30 ml of 1-hexene, followed by 1.0 ml of a solution of triisobutylaluminum in pentane (TOSO-AKZO; 145 mg/ml). One milliliter of the toluene slurry of the catalyst Component (C) obtained above (0.03 g/ml) was added to the mixture, and then 1.0 ml of a solution in toluene of dimethylsilylene-bis(tetrahydroindenyl) zirconium dichloride (0.25 mg/ml) was added. Fifty milliliter of hydrogen was added, and polymerization was carried out at an ethylene pressure of 7 Kg-G and a temperature of 70° C. for 45 minutes to give a polymer (ZrY 790,000) in an amount of 39.5 g.

EXAMPLE 2

(1) Preparation of the Catalyst Component (C)

The catalyst Component (C) was prepared in the same manner as in Example 1-(1).

(2) Polymerization

An 1 liter autoclave was purged with ethylene and charged with 500 ml of toluene and 1.2 ml of a solution of triisobutylaluminum in pentane (TOSO-AKZO; 145 mg/ml). Five milliliters of the toluene slurry of the catalyst Component (C) obtained above (0.03 g/ml) was added to the mixture, and then 2.5 ml of a solution in toluene of dimethylsilylene-bis(tetrahydroindenyl)zirconium dichloride (1.0 mg/ml) was added. Fifty milliliter of hydrogen was added, and polymerization was carried out at an ethylene pressure of 7 Kg-G and a temperature of 70° C. for 1.5 hours to give a polymer (ZrY 117,900) in an amount of 118 g.

EXAMPLE 3

(1) Preparation of the Catalyst Component (C)

The catalyst Component (C) was prepared in the same manner as in Example 1-(1).

(2) Polymerization

Polymerization was carried out in the same manner as in Example 2 except that 30 ml of 1-hexene was added after the addition of 500 ml of toluene in the polymerization in Example 2 to give 191 g of a polymer (ZrY 191,000).

EXAMPLE 4

(1) Preparation of the Catalyst Component (C)

The catalyst Component (C) was prepared in the same manner as in Example 1-(1).

(2) Polymerization

An 1 liter autoclave was purged with propylene and charged with 500 ml of toluene and 2.4 ml of a solution of triisobutylaluminum in pentane (TOSO-AKZO; 145 mg/ml). Ten milliliters of the toluene slurry of the catalyst Component (C) obtained above (0.03 g/ml) was added to the mixture, and then 5.0 ml of a solution in toluene of dimethylsilylene-bis(tetrahydroindenyl)zirconium dichloride (1.0 mg/ml) was added. Polymerization was carried out at a propylene pressure of 7 Kg-G and a temperature of 70° C. for 1.5 hours to give 106 g of a polymer (ZrY 106,000).

EXAMPLE 5

(1) Preparation of the Catalyst Component (C)

The catalyst Component (C) was prepared in the same manner as in Example 1-(1).

(2) Preliminary Contact of the Catalyst Components

In a 100 ml Erlenmeyer flask was placed 1.0 g of the catalyst Component (C) under nitrogen atmosphere. Twenty-five milliliters of pentane was added, and 4.86 ml of a solution of triethylaluminum (TEA) in pentane (TOSO-AKZO; 71 mg/ml) and 1.0 ml of a solution of bis(n-butylcyclopentadienyl)zirconium dichloride in toluene (3.0 mg/ml) were added.

(3) Polymerization

An 1 liter autoclave was purged with ethylene and charged with 500 ml of toluene and 1.0 ml of a solution of triisobutylaluminum in pentane (TOSO-AKZO; 145 mg/ml). Five milliliters of the catalyst slurry obtained above (in Example 5-(2)) was added to the solution, and then 50 ml of hydrogen was added. Polymerization was carried out at an ethylene pressure of 7 Kg-G and a temperature of 70° C. for 1.5 hours to give 38.4 g of a S polymer (ZrY 38,400).

EXAMPLE 6

The Procedure set forth in Example 2 was followed except for the polymerization step modified so that dimethylsilylene-bis-(tetrahydroindenyl)zirconium dichloride was replaced by dimethylsilylene-bis-(2-methyl-4-phenylindenyl)zirconium dichloride and the polymerization time of 1.5 hours was replaced by 20 minutes. 40 g of a polymer was obtained.

EXAMPLES 7–9

(1) Preparation of the Catalyst Component (C)

The catalyst Component (C) was prepared in the same manner as in Example 1-(1) except that boric acid $[B(OH)_3]$ was used in an amount set forth in Table 1.

(2) Polymerization

Polymerization was carried out in the same manner as in Example 2-(2) for polymerization of ethylene or as in Example 3-(2) for polymerization of ethylene with hexene except that Component (A) to (C), monomers and polymerization time used were those set forth in Table 1. The results obtained are shown in Table 1.

EXAMPLE 10

(1) Preparation of the Catalyst Component (C)

The catalyst Component (C) was prepared in the same manner as in Example 1-(1) except that 20 g of silica gel (Davison; #948) was replaced by 20 g of alumina (AKZO; grade H).

(2) Polymerization

Polymerization was carried out in the same manner as in Example 2-(2) except that the catalyst obtained in the preparation of the catalyst Component (C) in Example 10-(1) was used as the Component (C). The results obtained are shown in Table 1.

EXAMPLES 11 AND 12

(1) Preparation of the Catalyst Component (C)

The catalyst Component (C) was prepared in the same manner as in Example 1-(1) except that 20 g of silica gel (Davison; #948) was replaced by 20 g of aluminum phosphate (Davison; which passes through a sieve having a mesh size of 100 $\mu$m but remains on a sieve having a mesh size of 10 $\mu$m).

(2) Polymerization

Polymerization was carried out in the same manner as in Examples 3-(2) and 4-(2) except that the catalyst obtained in the preparation of the catalyst Component (C) in Example 11–12 was used as the Component (C). The results obtained are shown in Table 1.

EXAMPLE 13

(1) Preparation of the Catalyst Component (C)

The catalyst Component (C) was prepared in the same manner as in Example 1-(1) except that boric acid $[B(OH)_3]$ was replaced by metaboric acid $[B(O)_1(OH)_1]$ (Wako).

(2) Polymerization

Polymerization was carried out in the same manner as in Examples 2-(2) except that the Component (C) obtained in Example 13-(1) was used as the Component (C). The results obtained are shown in Table 1.

Comparative Example 1

(1) Treatment of Silica Gel

Only silica gel was treated in the same manner as in Example 1-(1) except that no boric acid $[B(OH)_3]$ was used.

(2) Polymerization

Polymerization was carried out in the same manner as in Examples 2-(2) except that the Component (C) was replaced by the silica gel treated in the procedure of Comparative Example 1-(1). The results obtained are shown in Table 1.

Comparative Example 2

(1) Treatment of Alumina

Only alumina was treated in the same manner as in Example 10-(1) except that no boric acid $[B(OH)_3]$ was used.

(2) Polymerization

Polymerization was carried out in the same manner as in Examples 2-(2) except that the Component (C) was replaced by the alumina treated in the procedure of Comparative Example 2-(1). The results obtained are shown in Table 1.

Comparative Example 3

(1) Treatment of Aluminum Phosphate

Only aluminum phosphate was treated in the same manner as in Example 11-(1) except that no boric acid $[B(OH)_3]$ was used.

(2) Polymerization

Polymerization was carried out in the same manner as in Examples 2-(2) except that the Component (C) was replaced by the aluminum phosphate treated in the procedure of Comparative Example 3-(1). The results obtained are shown in Table 1.

EXAMPLE 14

(1) Preparation of the Catalyst Component (C)

The catalyst Component (C) was prepared in the same manner as in Example 1-(1).

(2) Preparation of a Supported Catalyst

In a flask purged thoroughly with nitrogen was placed 2.5 g of the Component (C) obtained in Example 1-(1), and 50 ml of toluene was added. Next, 10.5 ml of a solution of triisobutylaluminum in pentane (TOSO-AKZO; 145 mg/ml) was added, and the mixture was stirred for 10 minutes. Furthermore, 3.75 ml of a solution of dimethylsilylene-bis(tetra-hydroindenyl)zirconium dichloride in toluene (10 mg/ml) was added dropwise with stirring. The mixture was then desiccated under nitrogen stream at room temperature to prepare a supported catalyst.

(3) Polymerization

An 1 liter autoclave was purged with ethylene and charged with 500 ml of toluene and 1.2 ml of a solution of triisobutylaluminum in pentane (TOSO-AKZO; 145 mg/ml). 0.21 g of the supported catalyst obtained in Example 14-(2) was added to the solution, and then 50 ml of hydrogen was added. Polymerization was carried out at an ethylene pressure of 7 Kg-G and a temperature of 70° C. for 2 hours to give 12.7 g of a polymer (ZrY 25,400).

EXAMPLE 15

(1) Preparation of the Catalyst Component (C)

The catalyst Component (C) was prepared in the same manner as in Example 1-(1).

(2) Preparation of a Supported Catalyst

In a flask purged thoroughly with nitrogen was placed 2.5 g of the Component (C) obtained in Example 1-(1), and 50 ml of toluene was added. Next, 3.75 ml of a solution of dimethylsilylene-bis(tetrahydroindenyl)zirconium dichloride in toluene (10 mg/ml) was added dropwise with stirring. The mixture was then desiccated under nitrogen stream at room temperature to prepare a supported catalyst.

(3) Polymerization

Polymerization was carried out in the same manner as in Example 14-(3) except that 0.17 g of the supported catalyst obtained in Example 15-(2) was used as a supported catalyst to give 18.9 g of a polymer (ZrY 37,000).

Comparative Example 4

(1) Treatment of Silica Gel

Silica gel was treated in the same manner as in Comparative Example 1-(1).

(2) Preparation of a Supported Catalyst

A supported catalyst was prepared in the same manner as in Example 14-(2) except that the Component (C) was replaced by the silica gel obtained in Comparative Example 1-(1).

(3) Polymerization

Polymerization was carried out in the same manner as in Example 14-(3) except that 0.21 g of the supported catalyst obtained in Comparative Example 4-(3) was used as the supported catalyst to give 2.0 g of a polymer (ZrY 4,000).

TABLE 1

| | Component (A) | Component (B) | Component (C) (boric acid % by weight) | Monomer | Comonomer | Polymerization period | Activity (g of polymer/ g of Zr) |
|---|---|---|---|---|---|---|---|
| Example 1 | Dimethylsilylene-bis(tetrahydro-indenyl)zirconium dichloride | TIBA | $SiO_2/B(OH)_3$ (20%) | Ethylene | 1-Hexene | 45 min. | 790,000 |
| Example 2 | Dimethylsilylene-bis(tetrahydro-indenyl)zirconium dichloride | TIBA | $SiO_2/B(OH)_3$ (20%) | Ethylene | — | 90 min. | 117,900 |
| Example 3 | Dimethylsilylene-bis(tetrahydro-indenyl)zirconium dichloride | TIBA | $SiO_2/B(OH)_3$ (20%) | Ethylene | 1-Hexene | 90 min. | 191,000 |
| Example 4 | Dimethylsilylene-bis(tetrahydro-indenyl)zirconium dichloride | TIBA | $SiO_2/B(OH)_3$ (20%) | Propylene | — | 90 min. | 106,000 |
| Example 5 | Bis(n-butylcyclo-pentadienyl)-zirconium dichloride | TEA | $SiO_2/B(OH)_3$ (20%) | Ethylene | — | 90 min. | 38,400 |
| Example 6 | Dimethylsilylene-bis(2-methyl-4-phenylindenyl)-zirconium dichloride | TIBA | $SiO_2/B(OH)_3$ (20%) | Ethylene | — | 20 min. | 56,000 |

TABLE 1-continued

|  | Component (A) | Component (B) | Component (C) (boric acid % by weight) | Monomer | Comonomer | Polymerization period | Activity (g of polymer/ g of Zr) |
|---|---|---|---|---|---|---|---|
| Example 7 | Dimethylsilylene-bis(tetrahydro-indenyl)zirconium dichloride | TIBA | $SiO_2/B(OH)_3$ (33%) | Ethylene | 1-Hexene | 90 min. | 53,000 |
| Example 8 | Dimethylsilylene-bis(tetrahydro-indenyl)zirconium dichloride | TIBA | $SiO_2/B(OH)_3$ (9.0%) | Ethylene | 1-Hexene | 45 min. | 51,000 |
| Example 9 | Dimethylsilylene-bis(tetrahydro-indenyl)zirconium dichloride | TIBA | $SiO_2/B(OH)_3$ (4.8%) | Ethylene | 1-Hexene | 60 min. | 47,400 |
| Example 10 | Dimethylsilylene-bis(tetrahydro-indenyl)zirconium dichloride | TIBA | $Al_2O_3/B(OH)_3$ (20%) | Ethylene | — | 90 min. | 10,000 |
| Example 11 | Dimethylsilylene-bis(tetrahydro-indenyl)zirconium dichloride | TIBA | $AlPO_3/B(OH)_3$ (20%) | Ethylene | 1-Hexene | 45 min. | 67,800 |
| Example 12 | Dimethylsilylene-bis(tetrahydro-indenyl)zirconium dichloride | TIBA | $AlPO_3/B(OH)_3$ (20%) | Propylene | — | 90 min. | 48,100 |
| Example 13 | Dimethylsilylene-bis(tetrahydro-indenyl)zirconium dichloride | TIBA | $SiO_2/BO(OH)$ (20%) | Ethylene | — | 90 min. | 120,000 |
| Comparative Example 1 | Dimethylsilylene-bis(tetrahydro-indenyl)zirconium dichloride | TIBA | only $SiO_2$ | Ethylene | — | 90 min. | 23,200 |
| Comparative Example 2 | Dimethylsilylene-bis(tetrahydroindenyl)zirconium dichloride | TIBA | only $Al_2O_3$ | Ethylene | — | 90 min. | 1,100 |
| Comparative Example 3 | Dimethylsilylene-bis(tetrahydro-indenyl)zirconium dichloride | TIBA | only $AlPO_3$ | Ethylene | — | 90 min. | 20,800 |

EXAMPLE 16

(1) Synthesis of the Catalyst Component (A)

Dimethylsilylenebis(2-methyl-4,5-benzindenyl) zirconium dichloride was synthesized according to the method described in EP 0545304A1.

a) Synthesis of benzindanone

In a reaction vessel purged with argon was weighed 36.4 g (273 mmole) of aluminum chloride, and 13.9 g (109 mmole) of naphthalene and 25 g (109 mmole) of α-bromoisobutyl bromide in methylene chloride solution (264 ml) was slowly added dropwise at room temperature. The mixture was stirred overnight, poured into ice-water, diluted with 250 ml of methylene chloride, and acidified with concentrated hydrochloric acid, and the organic phase was separated from the aqueous phase. As the organic phase was obtained in emulsion, it was filtered through celite, and the organic phase was washed with a saturated aqueous sodium hydrogen carbonate solution, dried over magnesium sulfate, and concentrated under reduced pressure to give 25.01 g of a crude product (isomeric ratio, 92:8). The crude product was purified by column chromatography (Merck; solvent, toluene) to give 12.36 g of benzindanone (58%) as a main product and 1.0554 g of a minor product (5%).

b) Synthesis of benzindanol

A 12.36 g portion of benzindanone (63 mmole) was dissolved in 300 ml of THF and 150 ml of methanol, and 3.6 g (95 mmole) of sodium borohydride was added at room temperature. After stirring the mixture for 6 hours, the reaction was terminated with dilute hydrochloric acid, and extracted with hexane (100 ml × 2) and ether (100 ml×2). Two stereoisomers of benzindanol were obtained. The crude product was used for the next reaction without purification.

c) Synthesis of benzindene

To the crude product of benzindanol dissolved in 200 ml of toluene was added 1.2 g (6.3 mmole) of p-toluenesulfonic acid, and the mixture was stirred at 80° C. for 15 minutes. The reaction was terminated with a saturated aqueous sodium hydrogen carbonate solution. The mixture was extracted with toluene, and the organic phase was washed with a saturated aqueous sodium hydrogen carbonate solution and a saturated aqueous sodium chloride solution, dried over magnesium sulfate, and concentrated under reduced pressure. The crude product of benzindene was obtained in an amount of 12.6 g, which was purified by column chromatography (Merck; solvent, hexane-ethyl acetate 0–1%). The product was obtained in an amount of 9.66 g (yield 85%).

d) Synthesis of bis(2-methyl-4,5-benzindenyl) dimethylsilane

In a reaction vessel purged with argon was weighed 0.41 g (2.3 mmole) of benzindene, and dissolved in 6.2 ml of toluene and 0.3 ml of THF. n-Butyl lithium (1.4 ml, corresponding to 2.3 mmole of a 1.65M hexane solution) was added, and the mixture was stirred at 80° C. for 1 hour. Next, dichlorodimethylsilane (0.14 ml, corresponding to 1.14 mmole) was added at 0° C., and the mixture was further stirred at 80° C. for 1 hour. The reaction was terminated with water. The mixture was extracted with ether, and the organic phase was dried over magnesium sulfate, and concentrated/dried under reduced pressure to give a crude product of bis(2-methyl-4,5-benzindenyl)dimethylsilane, which was purified by chromatography on a silica gel column (Merck; solvent, hexane-methylene chloride 15%). The yield was 0.1865 g (39%). The product was recrystallized from ether. The yield was 0.0496 g (10%).

e) Synthesis of rac-dimethylsilylenebis(2-methyl-4,5-benzindenyl)zirconium dichloride 0.92 g of bis(2-methyl-4,5-benzindenyl)dimethylsilane obtained by the above described method was dissolved in 25 ml of THF and cooled to −78° C., 3.0 ml of a 1.7M solution of n-butyl lithium in hexane was added dropwise, and the temperature of the mixture was raised over a period of 3 hours. The mixture was then concentrated/dried under reduced pressure, diluted with 100 ml of dichloromethane, and cooled to −78° C. Zirconium tetrachloride (0.51 mg) was then added slowly, and the temperature was raised up to room temperature over a period of 5 hours, and the mixture was reacted overnight at room temperature. After the reaction was completed, the solid products were removed by filtration, and the supernatant was concentrated under reduced pressure and washed thrice with 20 ml of toluene. Then, the residue was dissolved in 30 ml of dichloromethane for recrystallization to give 0.21 g of an orange solid. $^1$H-NMR revealed that the product was rac-dimethylsilylenebis(2-methyl-4,5-benzindenyl)zirconium dichloride.

$^1$H-NMR (300 MHz, CDCl$_3$): δ (ppm) 1.36 (s, 6H), 2.37 (s, 6H), 7.27–7.97 (m, 12H).

(2) Preparation of the Catalyst Component (C)

The catalyst Component (C) was prepared in the same manner as in Example 1-(1).

(3) Polymerization

A 1.5 liter autoclave was purged with nitrogen and charged with 500 ml of toluene, and 2 ml of a solution of triisobutylaluminum (TOSO-AKZO) in toluene (198 g/l) was further added. Next, 4 ml of the slurry of the catalyst Component (C) obtained above in toluene (30 g/l) was added, and 3 ml of a solution of the catalyst Component (A) in toluene (1.0 mmole/l) was added. The vapor phase portion in the autoclave was then purged with ethylene, and 60 ml of hydrogen was added. Polymerization was conducted at an ethylene pressure of 8 Kg-G and 90° C. for 8 minutes to give 26.4 g of a polymer Catalyst activity on Zr used, ZrY, was 97,800 g·polymer/g·Zr.

EXAMPLE 17

(1) Synthesis of the Catalyst Component (A)

Synthesis of dimethylsilylenebis[4-(1-phenyl-3-methylindenyl)]zirconium dichloride a) Synthesis of ethyl α-ethoxycarbonyl-o-bromocinnamate To a solution of 2-bromobenzaldehyde (74.5 g, 402.6 mmole) in benzene (200 ml) was added 53.2 g of dimethyl malonate (402.6 mmole). Piperidine (2.6 ml) was added to the solution, and the mixture was heated under reflux for 10 hours in a reaction vessel equipped with a Dien-Stark trap for removing water. After benzene was removed under reduced pressure, the mixture was purified by distillation to give 109.1 g of ethyl α-ethoxycarbonyl-o-bromo-cinnamate (91%).

b) Synthesis of ethyl 3-(2-bromophenyl)-2-ethoxycarbonyl-3-methylpropionate

To a solution in 500 ml of ether of 50.98 g of ethyl α-ethoxycarbonyl-o-bromo-cinnamate (170.5 mmole) and 1.0 g of copper bromide was added dropwise 56.7 ml of an ethereal solution of methylmagnesium bromide (175.6 mmole) at −20° C. The mixture was stirred overnight at room temperature, diluted with an aqueous ammonium chloride solution to separate the phases. The organic phase was dried over magnesium sulfate and concentrated under reduced pressure to give ethyl 3-(2-bromophenyl)-2-ethoxycarbonyl-3-methylpropionate.

c) Synthesis of ethyl 3-(2-bromophenyl)-3-methylpropionate

To a solution of 52.96 g the crude ethyl 3-(2-bromophenyl)-2-ethoxycarbonyl-3-methylpropionate (168.13 mmole) in dimethylsulfoxide (250 ml) and water (3 ml) was added 14 g of lithium chloride, and the mixture was heated at 150° C. for 2.5 hours. After cooling the mixture, dimethylsulfoxide was removed under reduced pressure, and the residue was diluted with an aqueous sodium chloride solution and extracted with ethyl acetate. The organic phase was washed with an aqueous ammonium chloride solution and dried over magnesium sulfate, and the solvent was removed under reduced pressure. The residual concentrate was further purified by distillation to give 28.04 g of ethyl 3-(2-bromophenyl)-3-methylpropionate (65%).

d) Synthesis of 3-(2-bromophenyl)-3-methylpropionic acid

To a solution of 28.04 g of ethyl 3-(2-bromophenyl)-3-methylpropionate (109.1 mmole) in ethanol (200 ml) and water (100 ml) was added 12.2 g of potassium hydroxide (218.2 mmole), and the mixture was heated under reflux for 5 hours. After the mixture was left standing at room temperature, it was concentrated to a half of the volume by distillation and diluted again with dilute hydrochloric acid. Dichloromethane was then added, and an aqueous ammonium chloride solution was added before extraction. The organic layer was dried over magnesium sulfate, and the solvent was removed by distillation to give 27.97 g of 3-(2-bromophenyl)-3-methylpropionic acid (quantitatively).

e) Synthesis of 4-bromo-3-methyl-1-indanone

To 10.36 g of 3-(2-bromophenyl)-3-methylpropionic acid (42.63 mmole) was added 30 ml of thionyl chloride, and the mixture was heated under reflux for 1.5 hours. Unreacted thionyl chloride was removed, and a small amount of carbon tetrachloride was added and also removed as well. The crude product of the acid chloride thus obtained was dissolved in carbon tetrachloride and added dropwise to a suspension of 7.4 g of aluminum chloride (55.42 mmole) in carbon tetrachloride (60 ml) at 0° C. After the solution was stirred at 0° C. for 30 minutes and at room temperature overnight, concentrated hydrochloric acid and dichloromethane were added for extraction. The organic layer was dried over magnesium sulfate, and the solvent was removed under reduced pressure. The residue was purified by chromatography on a silica gel column to give 7.71 g of 4-bromo-3-methyl-1-indanone (80%).

f) Synthesis of dimethylbis[4-(3-methyl-1-oxoindanyl)]silane

To 6.918 g of 4-bromo-3-methyl-1-indanone (30.75 mmole) were added 175 mg of para-toluenesulfonic acid (3 mmole), 7.6 ml of ethyl ortho-formate (46.12 mmole) and 17.1 ml of ethylene glycol (307.5 mmole), and the mixture was stirred at room temperature overnight. The mixture was diluted with an aqueous sodium hydrogen carbonate solution, extracted with ether and washed several times with an aqueous sodium hydrogen carbonate solution. The ethereal layer was separated and dried over magnesium sulfate, and the solvent was removed by distillation under reduced pressure to give 8.374 g of a crude ketal quantitatively. To a solution of the product in ether (100 ml) was added dropwise 20.4 ml (32.69 mmole) of a solution of n-butyl lithium in hexane at −5° C., and the mixture was stirred at −5° C. for 2.5 hours. Dimethyldichlorosilane (1.89 ml, 15.6 mmole) was added, and the resulting mixture was stirred at 0° C. for 1 hour, at room temperature for 2 hours and under reflux for 1 hour, and left standing overnight. The reaction mixture was diluted with an aqueous ammonium chloride solution, and the organic layer separated was dried over magnesium sulfate and concentrated under reduced pressure. The residual concentrate was diluted with acetone and para-toluenesulfonic acid, and the mixture was stirred at room temperature for 2.5 hours. The resulting mixture was diluted with an aqueous sodium hydrogen carbonate solution, and the organic layer separated was dried over magnesium sulfate and concentrated under reduced pressure. The residual concentrate was purified by chromatography on a silica gel column to give 4.05 g of dimethylbis [4-(3-methyl-1-oxoindanyl)]silane (75%).

g) Synthesis of dimethylbis[4-(1-phenyl-3-methylindenyl)] silane

To a solution of 1.54 g of dimethylbis[4-(3-methyl-1-oxoindanyl)]silane (4.425 mmole) in ether (90 ml) and tetrahydrofuran (9 ml) was added an ethereal solution of phenylmagnesium bromide (7.8 ml, 13.28 mmole), and the mixture was stirred at room temperature overnight and then heated under reflux for 2 hours. The mixture was diluted with an aqueous ammonium solution, and the organic layer separated was dried over magnesium sulfate and concentrated under reduced pressure. To the residual concentrate were added toluene (70 ml) and p-toluenesulfonic acid (45 ml, 5 mmole), and the mixture was stirred at 70° C. for 20 minutes. The resulting mixture was diluted with an aqueous sodium hydrogen carbonate solution, and the organic layer separated was dried over magnesium sulfate and concentrated under reduced pressure. The residual concentrate was purified by chromatography on a silica gel column to give 998 mg of dimethylbis[4-(1-phenyl-3-methylindenyl)]silane (48%).

h) Synthesis of dimethylsilylenebis[4-(1-phenyl-3-methylindenyl)]zirconium dichloride All of the following procedures were conducted under nitrogen atmosphere, and the solvents having been thoroughly dehydrated and deoxygenated were used.

To a solution of dimethylbis[4-(1-phenyl-3-methylindenyl)]silane (0.67 g, 1.43 mmole) prepared as above in toluene (30 ml) was slowly added dropwise 1.74 ml (2.85 mmole) of a solution of n-butyl lithium in hexane at 0° C., and the mixture was stirred at 0° C. for 15 minutes, at room temperature for 4 hours, and at 45° C. for 2 hours. The reaction mixture was concentrated, and a red solid thus obtained was dissolved in 30 ml of diethyl ether. The solution was cooled to −78° C., and a zirconium tetrachloride-diethyl ether complex was slowly added to the solution. After stirring at −78° C. for 1 hour, the temperature of the mixture was raised up to room temperature slowly over a period of 2 hours while the mixture was stirred continuously. The mixture was further stirred at room temperature for 15 hours. Then, the reaction mixture was concentrated, 40 ml of methylene chloride was added to the solid product thus obtained to extract the soluble portion. The extract was concentrated and recrystallized from methylene chloride-hexane to give dimethylsilylenebis[4-(1-phenyl-3-methylindenyl)]zirconium dichloride as a dark violet solid (yield, 55%).

(2) Preparation of the Catalyst Component (C)

The catalyst Component (C) was prepared in the same manner as in Example 1-(1).

(3) Polymerization

A 1.5 liter autoclave was purged with nitrogen and charged with 500 ml of toluene and 2 ml of a solution of triisobutylaluminum in toluene (TOSO-AKZO; 198 mg/ml). 4 ml of the toluene slurry of the catalyst Component (C) obtained above (30 g/l) was added to the solution, and then 3 ml of the toluene solution of the catalyst Component (A) (1.0 mmole/l) was added. The vapor phase portion of the autoclave is purged with ethylene, and 60 ml of hydrogen was added. Polymerization was carried out at an ethylene pressure of 8 Kg-G and a temperature of 90° C. for 40 minutes to give 15.0 g of a polymer (ZrY 55,600).

EXAMPLE 18

(1) Synthesis of the Catalyst Component (A)

Synthesis of dimethylsilylenebis(2-methyl-4-phenylazulenyl)zirconium dichloride a) Synthesis of dimethylbis[1-(2-methyl-4-phenyl-1,4-dihydroazulenyl)]silane To a solution of 2.22 g of 2-methylazulene (15.66 mmole) in hexane (30 ml) was added portionwise a solution of phenyl lithium in cyclohexane-ether (15.6 ml, 15.66 mmole) at 0° C. The mixture was stirred at room temperature for 1 hour, then cooled to −78° C., and diluted with 30 ml of tetrahydrofuran. Dimethyldichlorosilane (0.95 ml, 7.83 mmole) was added, and the temperature of the resulting mixture was raised up to room temperature. The mixture was further heated at 50–60° C. for 1.5 hours, diluted with an aqueous ammonium chloride solution, and the organic layer separated was dried over magnesium sulfate and concentrated under reduced pressure. The crude product thus obtained was purified by chromatography on a silica gel column to give 1.48 g of dimethylbis[1-(2-methyl-4-phenyl-1,4-dihydroazulenyl)]silane (38%).

b) Synthesis of dimethylsilylenebis(2-methyl-4-phenylazulenyl)zirconium dichloride All of the following procedures were conducted under nitrogen atmosphere, and the solvents having been thoroughly dehydrated and deoxygenated were used.

To a solution of dimethylbis[1-(2-methyl-4-phenyl-1,4-dihydroazulenyl)]silane (0.768 g, 1.55 mmole) prepared as above in diethyl ether (15 ml) was added dropwise 1.98 ml of a solution of n-butyl lithium in hexane at −76° C., and the temperature was slowly raised up to room temperature for reaction for 12 hours. The reaction mixture was then concentrated/dried in vacuo, washed with hexane, and concentrated/dried again. The concentrate was diluted with 20 ml of a mixed solvent of toluene/diethyl ether=40/1, and zirconium tetrachloride (0.325 g, 1.40 mmole) was added to the solution. The temperature was slowly raised up to room temperature, and the mixture was reacted for 15 hours. After the reaction was completed, the mixture was filtered. The residual solid was extracted with toluene, and the filtrate was concentrated. The concentrate was diluted with hexane and subjected to reprecipitation and recrystallization to give a racemic isomer of dimethylsilylenebis(2-methyl-4-phenylazulenyl)zirconium dichloride as a brownish yellow solid product.

(2) Preparation of the Catalyst Component (C)

The catalyst Component (C) was prepared in the same manner as in Example 1-(1).

(3) Polymerization

A 1.5 liter autoclave was purged with nitrogen and charged with 500 ml of toluene and 2 ml of a solution of triisobutylaluminum in toluene (TOSO-AKZO; 198 mg/ml). 4 ml of the toluene slurry of the catalyst Component (C) obtained above (30 g/l) was added to the solution, and then 3 ml of the toluene solution of the catalyst Component (A) (1.0 mmole/l) was added. The vapor phase portion in the autoclave was then purged with ethylene, and 60 ml of hydrogen was added. Polymerization was carried out at an ethylene pressure of 8 Kg-G and a temperature of 90° C. for 20 minutes to give 17.9 g of a polymer (ZrY 66300).

EXAMPLE 19

(1) Synthesis of the Catalyst Component (A)

Synthesis of bis(2,3,4,5-tetramethyl-phosphoryl)zirconium dichloride
a) Synthesis of 1-phenyl-2,3,4,5-tetramethylphosphor Under nitrogen atmosphere, 13.6 g of aluminum chloride was suspended in 150 ml of dichloromethane. Dichloromethane (150 ml) containing 2-butyne (15 ml) was added to be suspension dropwise in an ice bath over a period of 20 minutes, and the mixture was stirred directly for 30 minutes. The reaction was further continued at room temperature for 30 minutes to give a dark red solution. The mixture was cooled to –60° C., and dichloromethane (150 ml) containing dichlorophenylphosphine (19.9 g) was added dropwise. The temperature of the resulting mixture was raised up to room temperature with stirring to give a dark red solution.

To the solution was added dropwise tri-n-butylphosphine (35 ml) dissolved in dichloromethane (150 ml) at a temperature of –30° C. over a period of 10 minutes. The solution turned pale yellow. The solvent was removed under reduced pressure to give a viscous yellowish brown solid.

The product was extracted with 700 ml of hexane, and the extract was washed with 200 ml of an aqueous sodium hydrogen carbonate solution (5% by weight) and 400 ml of pure water. Anhydrous magnesium sulfate (30 g) was added as a desiccating agent, and the mixture was left standing overnight.

Anhydrous magnesium sulfate was removed by filtration, and the hexane solution was concentrated/dried to give 1-phenyl-2,3,4,5-tetramethylphosphor as a pale yellow oil (yield, 80%).
b) Synthesis of bis(2,3,4,5-tetramethylphosphoryl)zirconium dichloride Under argon atmosphere, 2.89 g of 1-phenyl-2,3,4,5-tetramethylphosphor (13.4 mmole) was dissolved in dry tetrahydrofuran (50 ml). To the solution was added 0.37 g of granular metal lithium, and the solution turned dark red. The mixture was subjected reaction with stirring for 3 hours.

After the reaction, the dark red solution portion was separated from the lithium reaction residue, and, to deactivate the catalyst, 0.60 g of anhydrous aluminum chloride (4.50 mmole) was added to the solution over a period of 10 minutes in an ice bath. The mixture was further reacted for 3 hours to form a product called solution A.

Under a nitrogen gas atmosphere, 1.48 g of zirconium tetrachloride (6.35 mmole) was suspended in 15 ml of toluene and placed in an ice bath. The solution A was added dropwise to the solution over a period of 15 minutes, and the reaction was further continued for 30 minutes. After the temperature was raised up to room temperature, the mixture was concentrated under reduced pressure to dryness.

The dry product was extracted with 130 ml of dry diethyl ether and concentrated to dryness, and the same procedure was followed with 60 ml of dry n-heptane to give 1.24 g of bis(2,3,4,5-tetramethylphosphoryl)zirconium dichloride in orange as the desired product (44%).

(2) Preparation of the Catalyst Component (C)

The catalyst Component (C) was prepared in the same manner as in Example 1-(1).

(3) Polymerization

A 1.5 liter autoclave was purged with nitrogen and charged with 500 ml of toluene and 2 ml of a solution of triisobutylaluminum in toluene (TOSO-AKZO; 198 mg/ml). 4 ml of the toluene slurry of the catalyst Component (C) obtained above (30 g/l) was added to the solution, and then 2 ml of the toluene solution of the catalyst Component (A) (1.0 mmole/l) was added. The vapor phase portion in the autoclave was then purged with ethylene, and 60 ml of hydrogen was added. Polymerization was carried out at an ethylene pressure of 8 Kg-G and a temperature of 90° C. for 45 minutes to give 21.2 g of a polymer (ZrY 117,800).

EXAMPLE 20

(1) Synthesis of the Catalyst Component (A)

Synthesis of dimethylsilylenebis[4-(1-indolyl)-2-methylindenyl]zirconium dichloride
a) Synthesis of diethyl 2-(2-bromobenzyl)-2-methylmalonate In a reaction vessel purged with nitrogen was weighed 14.0 g of sodium hydroxide (349 mmole), and suspended in 200 ml of toluene, to which 100 ml of a toluene solution of diethyl ethylmalonate (60.0 ml, 320 mmole) was added dropwise in an ice bath. After the addition was completed and the mixture was stirred at room temperature for 3 hours, 100 ml of a toluene solution of 2-bromobenzyl bromide (80.0 g, 320 mmole) was added dropwise, and the mixture was stirred overnight. The reaction was terminated by pouring the reaction mixture to dilute hydrochloric acid, and the organic layer was washed with water, dried and concentrated to give 120 g of diethyl 2-(2-bromobenzyl)-2-methylmalonate as a yellow oil (yield, 100%).
b) Synthesis of ethyl 3-(2-bromophenyl)-2-methylpropionate To a solution of diethyl 2-(2-bromobenzyl)-2-methylmalonate (108 g, 310 mmole) in dimethylsulfoxide (350 ml) were added 26.4 g of lithium chloride (620 mmole) and 5.6 ml of water (310 mmole). After stirring at 180° C. for 8 hours, the product was extracted with n-hexane and concentrated to give 84.1 g of ethyl 3-(2-bromophenyl)-2-methylpropionate as a yellow oil (yield, 100%).
c) Synthesis of 3-(2-bromophenyl)-2-methylpropionic acid 65.5 g of ethyl 3-(2-bromophenyl)-2-methylpropionate (243 mmole) and 20.5 g of potassium hydroxide (364 mmole) were dissolved in 250 ml of ethanol and heated under reflux for 6 hours, and 500 ml of water was added. After 50 ml of concentrated hydrochloric acid was added, and the product was then extracted with toluene, dried and concentrated to give 37.8 g of 3-(2-bromophenyl)-2-methylpropionic acid as a yellow oil (yield, 89%).

d) Synthesis of 4-bromo-2-methylindan-1-one

To 52.5 g of 3-(2-bromophenyl)-2-methylpropionic acid (215 mmole) were added 210 g of polyphosphoric acid and 250 ml of o-dichlorobenzene, and the mixture was stirred at 140° C. for 6 hours. The mixture was diluted with 300 ml of water, and the product was extracted with n-hexane and ether, dried and concentrated, and the residual concentrate thus obtained was distilled to give 27.3 g of 4-bromo-2-methylindan-1-one as a colorless oil (yield, 56%).

e) Synthesis of 4-(1-indolyl)-2-methylindanon-1-one

In a reaction vessel were weighed 21.5 g of 4-bromo-2-methylindan-1-one (95.4 mmole), 11.4 g of indol (97.1 mmole), 13.4 g of anhydrous potassium carbonate and 0.49 g of copper (II) oxide, and the mixture was dissolved in 19 ml of N,N-dimethylformamide. After heating under reflux for 5 days, the reaction mixture was dissolved in ether and water and filtered through celite. The organic layer obtained was separated, washed with water, dried, concentrated, and purified by chromatography on a column (basic gel manufactured by FUJI SILISIA, ethyl acetate/n-hexane) to give 4.23 g of 4-(1-indolyl)-2-methylindanon-1-one as a black oil (yield, 17%).

f) Synthesis of 4-(1-indolyl)-2-methylindanon-1-ol

To a solution of 4.23 g of 4-(1-indolyl)-2-methylindanon-1-one (16.2 mmole) in 80 ml of tetrahydrofuran was added 1.08 g of sodium borohydride (28.5 mmole), and the mixture was further diluted slowly with 40 ml of methanol and stirred at room temperature overnight. The reaction was terminated with a saturated aqueous ammonium chloride solution, and the product was extracted with n-hexane and ether, dried, concentrated, and purified by chromatography on a column (basic gel manufactured by FUJI SILISIA, ethyl acetate/n-hexane) to give 2.74 g of a mixture of the two diastereoisomers of 4-(1-indolyl)-2-methylindan-1-ol as an oil (yield, 64%).

g) Synthesis of 7-(1-indol)-2-methylindene

To a solution of 2.74 g of 4-(l-indolyl)-2-methylindan-1-ol (10.4 mmole) in 50 ml of toluene was added 0.24 g of p-toluenesulfonic acid, and the mixture was stirred at 70° C. for 1 hour. The reaction was terminated with a saturated aqueous sodium hydrogen carbonate solution, and the mixture was then extracted with ether, dried, concentrated and purified by column chromatography (basic gel manufactured by FUJI SILISIA, n-hexane) to give 1.68 g of 7-(1-indol)-2-methylindene as a yellow oil (yield, 66%).

h) Synthesis of bis[7-(l-indolyl)-2-methylindenyl]dimethylsilane

Under nitrogen atmosphere, 1.64 g of 7-(1-indol)-2-methylindene (6.69 mmole) was dissolved in 34 ml of dry toluene and 1.7 ml of dry tetrahydrofuran, and 4.0 ml of a 1.68M solution of n-butyl lithium in n-hexane (6.7 mmole) was added dropwise. The resulting mixture was heated at 80° C. for 30 minutes, followed by addition at 0° C. to the mixture of 0.36 ml of dichlorodimethylsilane (3.0 mmole) and then by agitation at 80° C. for 2 hours, the reaction was then stopped by adding 50 ml of a saturated aqueous sodium hydrogen carbonate solution, and the product was extracted with ether. The extract was dried, concentrated and purified by column chromatography (silica gel, toluene/n-hexane) and then by column chromatography (silica gel, toluene/n-hexane) to give 0.86 g of bis[7-(l-indolyl)-2-methylindenyl] dimethylsilane as a brown oil (yield, 24%).

i) Synthesis of dimethylsilylenebis[4-(l-indolyl)-2-methylindenyl]zirconium dichloride Under nitrogen atmosphere, 0.82 g of bis[7-(1-indolyl)-2-methylindenyl]dimethylsilane (1.5 mmole) was dissolved in a mixed solvent of 12 ml of dry toluene and 0.6 ml of dry tetrahydrofuran, and 1.8 ml of a 1.71M solution of n-butyl lithium in hexane (3.1 mmole) was added. After heating under reflux for 4 hours, the solvent was removed under reduced pressure to give a red solid. The product was diluted with 9 ml of toluene and 0.5 ml of ether, and 0.35 g of zirconium tetrachloride (1.5 mmole) was added at −45° C. The temperature was raised up to room temperature over a period of all night, and the solvent was removed under reduced pressure. To the residual concentrate was added dry methylene chloride, and the resulting suspension was filtered. The precipitates were washed with dry n-hexane, and dried under reduced pressure to give 0.21 g of dimethylsilylenebis[4-(1-indolyl)-2-methylindenyl] zirconium dichloride as a yellow solid.

(2) Preparation of the Catalyst Component (C)

The catalyst Component (C) was prepared in the same manner as in Example 1-(1).

(3) Polymerization

A 1.5 liter autoclave was purged with nitrogen and charged with 500 ml of toluene and 2 ml of a solution of triisobutylaluminum in toluene (TOSO-AKZO; 198 mg/ml). 4 ml of the toluene slurry of the catalyst Component (C) obtained above (30 g/l) was added to the solution, and then 3 ml of the toluene solution of the catalyst Component (A) (1.0 mmole/l) was added. The vapor phase portion in the autoclave was then purged with ethylene, and 60 ml of hydrogen was added. Polymerization was carried out at a ethylene pressure of 8 Kg-G and a temperature of 90° C. for 50 minutes to give 3.7 g of a polymer (ZrY 20,600).

EXAMPLE 21

(1) Synthesis of the Catalyst Component (A)

The catalyst Component (A) was prepared in the same manner as in Example 16-(1).

(2) Preparation of the Catalyst Component (C)

The catalyst Component (C) was prepared in the same manner as in Example 1-(1).

(3) Polymerization

A 1.5 liter autoclave was purged with nitrogen and charged with 500 ml of toluene and 2 ml of a solution of triisobutylaluminum in toluene (TOSO-AKZO; 198 mg/ml). 4 ml of the toluene slurry of the catalyst Component (C) obtained above (30 g/l) was added to the solution, and then 3 ml of the toluene solution of the catalyst Component (A) (1.0 mmole/l) was added. The vapor phase portion in the autoclave was then purged with propylene, and 90 ml of hydrogen was added. Polymerization was carried out at a propylene pressure of 6 Kg-G and a temperature of 70° C. for 60 minutes to give 13.1 g of a polymer (ZrY 72,800).

The polymerization results obtained in Examples 16–21 are set forth in Table 2.

EXAMPLE 22

The procedure set forth in Example 20 was followed except for the polymerization step modified so that the catalyst Component (A) was replaced by dimethylsilylene (tetramethylcyclopentadienyl)-tert-butylamidotitanium dichloride and the polymerization time of 50 minutes was replaced by 60 minutes. 8.0 g of a polymer was obtained (TiY 64,000).

TABLE 2

|  | Component (A) | Component (B) | Component (C) (weight of boric acid) | Monomer | Comonomer | Polymerization period | Activity (g of polymer/ g of Zr) |
|---|---|---|---|---|---|---|---|
| Example 16 | Dimethylsilylenebis-(2-methyl-4,5 benzindenyl)-zirconium dichloride | TIBA | SiO$_2$/B(OH)$_3$ (20%) | Ethylene | — | 8 min. | 97,800 |
| Example 17 | Dimethylsilylenebis-[4-(1-phenyl-3 methylindenyl)] zirconium dichloride | TIBA | SiO$_2$/B(OH)$_3$ (20%) | Ethylene | — | 40 min. | 55,600 |
| Example 18 | Dimethylsilylenebis-(2-methyl-4-phenylazulenyl)-zirconium dichloride | TIBA | SiO$_2$/B(OH)$_3$ (20%) | Ethylene | — | 20 min. | 66,300 |
| Example 19 | Bis(2,3,4,5-tetra-methylphosphoryl)-zirconium dichloride | TIBA | SiO$_2$/B(OH)$_3$ (20%) | Ethylene | — | 45 min. | 117,800 |
| Example 20 | Dimethylsilylenebis-[4-(1-indolyl)-2-methylindenyl)-zirconium dichloride | TIBA | SiO$_2$/B(OH)$_3$ (20%) | Ethylene | — | 50 min. | 20,600 |
| Example 21 | Dimethylsilylenebis-(2-methyl-4-phenyl-azulenyl)zirconium dichloride | TIBA | SiO$_2$/B(OH)$_3$ (20%) | Propylene | — | 60 min. | 72,800 |

What is claimed is:

1. A catalyst for olefin polymerization in the absence of alumoxane prepared by contacting components consisting essentially of:

Component (A) which is a transition metal compound having at least one conjugated five-membered ring ligand, the transition metal being in the Groups IV–VI of the Periodic Table, Component (B) which is an organoaluminum compound represented by the formula (V):

$$R_3Al \qquad (V)$$

wherein R represents hydrogen, halogen, a siloxy group, a siloxy group cross linked with an alkylene having 1 to 6 carbon atoms, or a hydrocarbyl group having 1 to 10 carbon atoms, and may be the same or different when a plurality of R groups are present, provided that at least one of the three R groups represents a hydrocarbyl group having 1 to 10 carbon atoms, and Component (C) which is a non-aqueous finely divided particle composition comprising (i) 0.1–99.9% by weight of boric acid based on the weight of the particle composition and (ii) 99.9–0.1% by weight of finely divided material other than boric acid, wherein component (C) has been prepared by contacting a solution of boric acid that may be aqueous, with said finely divided material (ii) followed by heating so that all evaporative water is removed.

2. The catalyst for olefin polymerization according to claim 1, wherein the compound represented by the formula [V] is such that at least one of the substituent R is methyl, ethyl or isobutyl.

3. The catalyst for olefin polymerization according to claim 1, wherein the compound of the formula [V] is selected from the group consisting of trimethylaluminum, triethylaluminum, triisobutylaluminum, and a mixture thereof.

4. The catalyst for olefin polymerization according to claim 1, wherein the Component (A) is represented by the formulae (I), (II), (III) or (IV):

wherein Me represents a metal atom selected from the group consisting of the metallic elements of Groups IV–VI of the Periodic Table, A and A', which may be the same or different within the same compound, represent a conjugated five-membered ring ligand, Q represents a first bonding moiety which crosslinks the conjugated five-membered ring ligands A and A' at any ring position, Z represents a ligand containing nitrogen, oxygen, silicon, phosphorus or sulfur atom which is bonded to Me, Q' represents a second bonding moiety which crosslinks the conjugated five-membered ring ligand A at any ring position with the moiety Z, and X and Y represent a hydrogen atom, a halogen atom, a hydrocarbyl group, an alkoxy group, an amino group, a phosphorus-containing hydrocarbon group or a silicon-containing hydrocarbon group, respectively.

5. The catalyst for olefin polymerization according to claim 4, wherein the compound represented by the formulae [I], [II], [III] or [IV] is such that:

A and A' are, respectively, cyclopentadienyl, n-butyl-cyclopentadienyl, indenyl, 2-methyl-indenyl, 2-methyl-4-phenylindenyl, tetrahydroindenyl, 2-methyl-tetrahydroindenyl, 2-methylbenzindenyl, 1-phenyl-3-methylindenyl, 2-methyl-4-phenylazulenyl, 2,3,4,5-tetramethylphosphoryl or 1-indolyl-2-methylindenyl;

Q and Q' are, respectively, ethylene, dimethylsilylene or isopropylidene;

Z is t-butylamido, phenylamido or cyclohexylamido;

Me is a transition metal in the Group IV;

X and Y are, respectively, chlorine, methyl, or diethylamino.

6. The catalyst for olefin polymerization according to any one of claims 4 and 5, wherein the Component (A) is the compound represented by the formula (I), (II) or (IV).

7. The catalyst for olefin polymerization according to claim 1, wherein the Component (C) is a finely divided particle composition comprising (i) 0.1 to 99.9% by weight of boric acid represented by the following formula (VI) and (ii) 99.9% to 0.1% by weight of finely divided particle materials selected from the group consisting of (a)–(g):

B(O)n(OH)m−n　　　　　(VI)

wherein n and m are such that, under the conditions of $0<m-n\leq 3$, $0\leq n<1.5$, and $n<m\leq 3$, m is 3 when n is 0; m is in the range $2<m<3$ when n is in the range $0<n<1$; m is 2 when n is 1, and m is in the range $1.5<m<2$ when n is in the range $1<n<1.5$, (a) α-olefin polymers, selected from the group consisting of polyethylene, polypropylene, polybutene-1, an ethylene-propylene copolymer, an ethylene-butene-1 copolymer, an ethylene-hexene-1 copolymer, a propylene-butene-1 copolymer, a propylene-hexene-1 copolymer, and a propylene-divinyl benzene copolymer;

(b) aromatic unsaturated hydrocarbon polymers selected from the group consisting of polystyrene, a styrene-divinyl benzene copolymer, a styrene butadiene copolymer, and a styrene-isoprene copolymer;

(c) polymers containing a polar moiety selected from the group consisting of a poly(meth)acrylate ester, polyacrylonitrile, polyvinyl chloride, polyamide, polyphenylene ether, polyethylene terephthalate, and polycarbonate; and ion-exchange resins containing a polar moiety;

(d) inorganic oxides selected from the group consisting of $SiO_2$, $Al_2O_3$, $AlPO_4$, $MgO$, $ZrO_2$, $TiO_2$, $B_2O_3$, $CaO$, $ZnO$, $BaO$, $ThO$, $SiO_2$—$MgO$, $SiO_2$—$Al_2O_3$, $SiO_2$—$TiO_2$, $SiO_2$—$V_2O_5$, $SiO_2$-$Cr_2O_3$, and $SiO_2$—$TiO_2$—$MgO$;

(e) inorganic halides selected from the group consisting of $MgCl_2$, $AlCl_3$ and $MnCl_2$;

(f) inorganic carbonates, sulfates or nitrates selected from the group consisting of $Na_2CO_3$, $K_2CO_3$, $CaCO_3$, $MgCO_3$, $Al_2(SO_4)_3$. $BaSO_4$, $KNO_3$, and $Mg(NO_3)_2$; and (g) inorganic hydroxides selected from the group consisting of $Mg(OH)_2$, $Al(OH)_3$ and $Ca(OH)_2$.

8. The catalyst for olefin polymerization according to claim 7, wherein the particles in Component (C) have diameters in the range of 1–3,000 μm.

9. The catalyst for olefin polymerization according to claim 7, wherein the particles in Component (C) have diameters in the range of 10–1,000 μm.

10. The catalyst for olefin polymerization according to claim 7, wherein the Component (C) is prepared by contacting the ingredients (i) and (ii) in a solvent in which either one of the ingredients is soluble or suspended, and the solvent is then removed.

11. The catalyst for olefin polymerization according to claim 7, wherein the ingredient (ii) is an inorganic oxide.

* * * * *